(12) United States Patent
Unal et al.

(10) Patent No.: US 7,957,591 B2
(45) Date of Patent: Jun. 7, 2011

(54) METHOD AND APPARATUS FOR PERFORMING SEGMENTATION BASED ON PARTIAL DIFFERENTIAL EQUATIONS

(75) Inventors: Gozde Unal, West Windsor, NJ (US); Bertrand Peny, Fechy (CH); Gregory G. Slabaugh, Princeton, NJ (US); Christopher Alvino, Allenwood, NJ (US); Tong Fang, Morganville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1131 days.

(21) Appl. No.: 11/538,849

(22) Filed: Oct. 5, 2006

(65) Prior Publication Data

US 2007/0110310 A1 May 17, 2007

Related U.S. Application Data

(60) Provisional application No. 60/724,374, filed on Oct. 7, 2005.

(51) Int. Cl.
*G06K 9/34* (2006.01)
(52) U.S. Cl. ........................................................ 382/173
(58) Field of Classification Search .................. 382/173
See application file for complete search history.

(56) References Cited

U.S. PATENT DOCUMENTS

| | | | |
|---|---|---|---|
| 2004/0008886 A1* | 1/2004 | Boykov | 382/173 |
| 2005/0163356 A1* | 7/2005 | Makram-Ebeid et al. | 382/128 |
| 2005/0213816 A1* | 9/2005 | Porikli | 382/173 |
| 2005/0249399 A1* | 11/2005 | Tek et al. | 382/154 |

OTHER PUBLICATIONS

Song Chun Zhu; Yuille, A.; , "Region competition: unifying snakes, region growing, and Bayes/MDL for multiband image segmentation," Pattern Analysis and Machine Intelligence, IEEE Transactions on , vol. 18, No. 9, pp. 884-900, Sep. 1996 doi: 10.1109/34.537343 URL: http://ieeexplore.ieee.org/stamp/stamp.jsp?tp=&arnumber=537343&isnumber=11568.*

Gomes, J.; Faugeras, O.; , "Segmentation of the inner and outer surfaces of the human cortex: an approach based on partial differential equations," Engineering in Medicine and Biology Society, 2000. Proceedings of the 22nd Annual International Conference of the IEEE , vol. 3, no., pp. 1764-1774 vol. 3, 2000.*

E. Sifakis, et al., "Bayesian Level Sets for Image Segmentation", Downloaded from www.csd.uoc.gr/~tziritas/papers/segment.pdf on Sep. 27, 2006.

L. Cohen, et al., "Global Minimum for Active Contour Models: A Minimal Path Approach", International Journal of Computer Vision, vol. 24, No. 1, pp. 57-78 (1997).

T. Deschamps, et al., "Fast Extraction of Minimal Paths in 3D Images and Applications to Virtual Endoscopy", Medical Image Analysis 5, pp. 281-299 (2001).

T. Deschamps, et al., "Fast Extraction of Tubular and Tree 3D Surfaces with Front Propagation Methods", International Conference on Pattern Recognition, pp. 731-734 (2002).

(Continued)

*Primary Examiner* — Brian P Werner
*Assistant Examiner* — Nirav G Patel

(57) ABSTRACT

Disclosed is a method and system for propagating information about an image to segment a target structure. An input to denote a region of interest of the image containing the target structure is received. A first seed is set outside of the target structure and a second seed is set inside the target structure. A first partial differential equation (PDE) associated with the first seed is solved and a second PDE associated with the second seed is solved to segment the image.

25 Claims, 7 Drawing Sheets

OTHER PUBLICATIONS

L. Grady, et al., "Multi-Label Image Segmentation for Medical Applications Based on Graph-Theoretic Electrical Potentials", Proc. 8th EU Conf. on Comp. Vision (ECCV04) (2004).

F. Meyer, et al., "Multiscale Morphological Segmentations Based on Watershed, Flooding, and Eikonal PDE", Scale-Space '99, LNCS 1682, pp. 351-362 (1999).

P. Perona, et al., "Scale-Space and Edge Detection Using Anisotropic Diffusion", IEEE Trans. Pattern Analysis and Machine Intelligence, vol. 12, No. 7 (1990).

A. Sofou, et al., "PDE-Based Modeling of Image Segmentation Using Volumic Flooding", Proceedings of International Conference on Image Processing (2003).

* cited by examiner

METHOD AND APPARATUS FOR PERFORMING SEGMENTATION BASED ON PARTIAL DIFFERENTIAL EQUATIONS

This application claims the benefit of U.S. Provisional Application No. 60/724,374 filed Oct. 7, 2005, which is incorporated herein by reference.

BACKGROUND OF THE INVENTION

The present invention relates generally to segmentation of an image, and more particularly to segmentation of a target structure of an image based on the solution of distinct partial differential equations (PDEs).

Content extraction from images typically relies on segmentation, i.e., extraction of the borders of target structures. Automated segmentation by computer algorithms has been a focus of research. In practice, the accuracy of a segmentation algorithm can be hampered by noise in the image acquisition and the complexity of the arrangement of target objects with respect to their surroundings within the image. In order to increase the accuracy of a segmentation algorithm, the algorithm typically has to become more complex and this often leads to an increase in computational cost.

Therefore, there remains a need to more efficiently and accurately segment a target structure of an image.

BRIEF SUMMARY OF THE INVENTION

The inventors have invented a method and system for segmenting a target structure of an image more efficiently and accurately. In one embodiment, one or more inputs to designate (e.g., mark) a region of interest (ROI) of the image is received. The region of interest is the initial input from the user that points to the image domain that is going to be used by the segmentation algorithm. The segmentation aims to segment a target structure (e.g., a lymph node).

A first seed is then set outside of the target structure and a second seed is set inside the target structure. A first partial differential equation (PDE) associated with the first seed is solved (e.g., by a fast marching algorithm) and a second PDE associated with the second seed is also solved (e.g., by a fast marching algorithm) to segment the image. The first PDE and/or the second PDE can be either an Eikonal differential equation or a diffusion equation.

The solving of the PDEs enables the determination of an exterior distance function associated with a plurality of pixels outside the target structure and an interior distance function associated with a plurality of pixels inside the target structure. A competition criterion is then used between the interior distance function and the exterior distance function to determine and segment the target structure. The determining of the target structure can additionally include determining whether the interior distance function or the exterior distance function has a minimum distance from the first seed (or the second seed). The solution of the PDEs to produce the distance functions enables the increase in accuracy and efficiency in the segmentation of an image.

These and other advantages of the invention will be apparent to those of ordinary skill in the art by reference to the following detailed description and the accompanying drawings.

DETAILED DESCRIPTION

Figure 1:
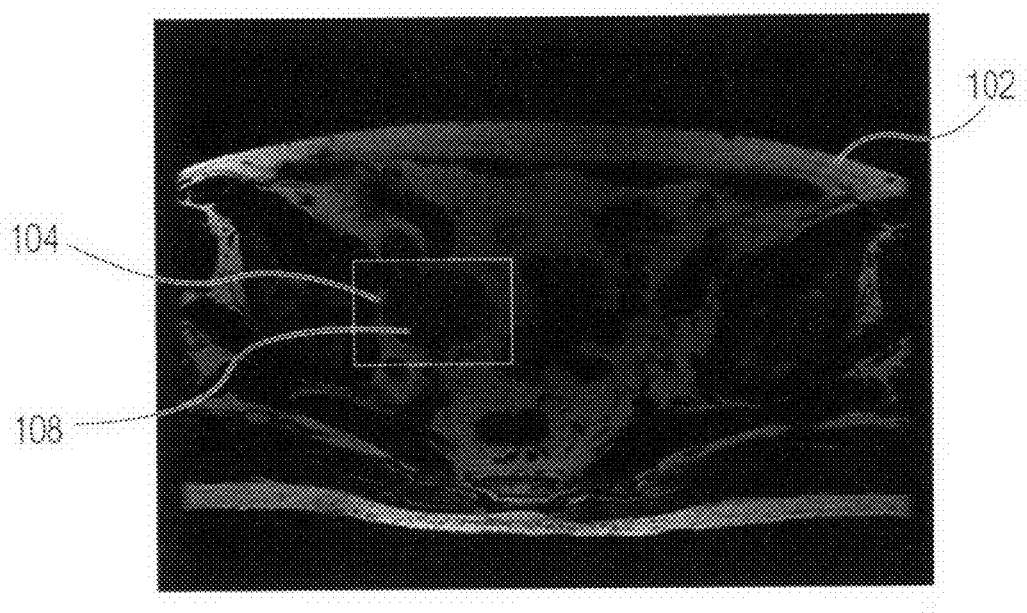
FIG. 1 is a magnetic resonance (MR) image with a region of interest (ROI) around a lymph node.

FIG. 1 is a magnetic resonance (MR) image 102 with a region of interest (ROI) 104 (e.g., selected by a radiologist) around a target structure (e.g., a lymph node) 108. The extraction of the target structure 108 from the rest of the image 102 enables subsequent quantitative analysis of the structure 108. As discussed above, such extraction can be accomplished using a segmentation method. In particular, segmentation methods based on information propagation, where a fictitious moving front is being propagated from a set of seeds by image characteristic information, have been performed in various medical applications using distance functions. For example, simultaneous propagation has been performed to estimate two potentials between two points in order to extract the path made by a vessel. In such an application, the minimal paths between two points, $p_0$ and $p_1$, are computed by simultaneous propagations from the two points until they meet at a common point $p_2$, and by back-propagating to the original two points.

In accordance with an embodiment of the present invention, distance functions distinguishing between image locations on opposite sides of an edge or, alternatively, identifying locations of higher gradient magnitude (i.e., a greater change in light intensity between two adjacent pixels of an image) are computed. To obtain these distance functions, partial differential equations (PDEs), such as the Eikonal equation or diffusion equations, are solved. In one embodiment, the PDEs can be computed according to a function of the form O(N log N), where N is the number of image pixels. In the case where diffusion PDEs are used, edge information is propagated from the interior of the desired anatomical structure or from the boundary of the region of interest.

Once the distance functions are computed, a distance function competition occurs in order to determine the target structure of the ROI and to subsequently segment the target structure from the ROI.

Segmentation by Distance Function Competition

Figure 2:
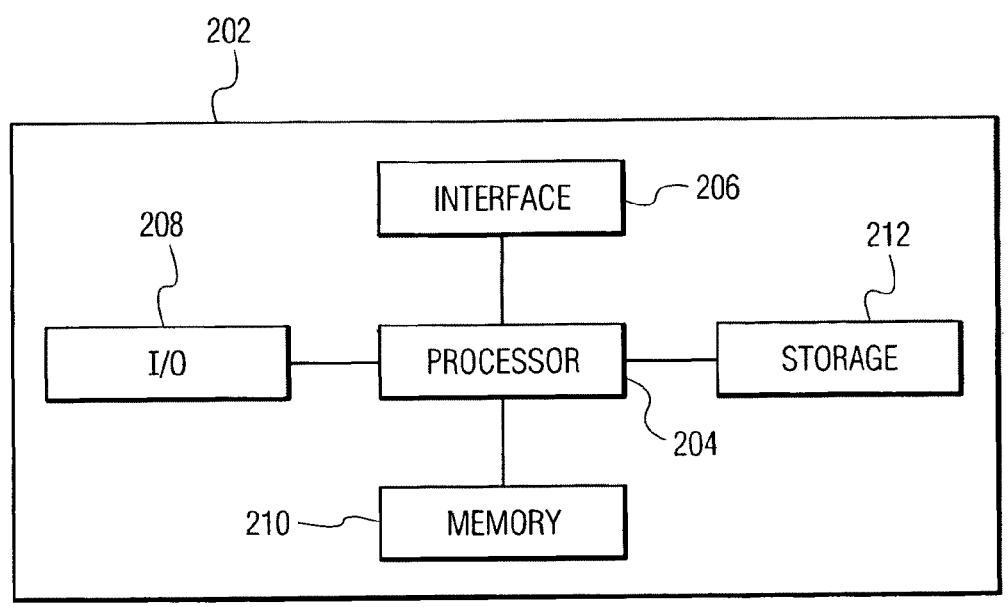
FIG. 2 shows a high level block diagram of a computer in accordance with an embodiment of the invention.

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk) and loaded into memory 210 when execution of the computer program instructions is desired. Computer 202 also includes one or more interfaces 206 for communicating with other devices (e.g., locally or via a network), Computer 202 also includes input/output 208 which represents devices which allow for user interaction with the computer 202 (e.g., display, keyboard, mouse, speakers, buttons, etc.).

One skilled in the art will recognize that an implementation of an actual computer will contain other components as well, and that FIG. 2 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

Figure 3:
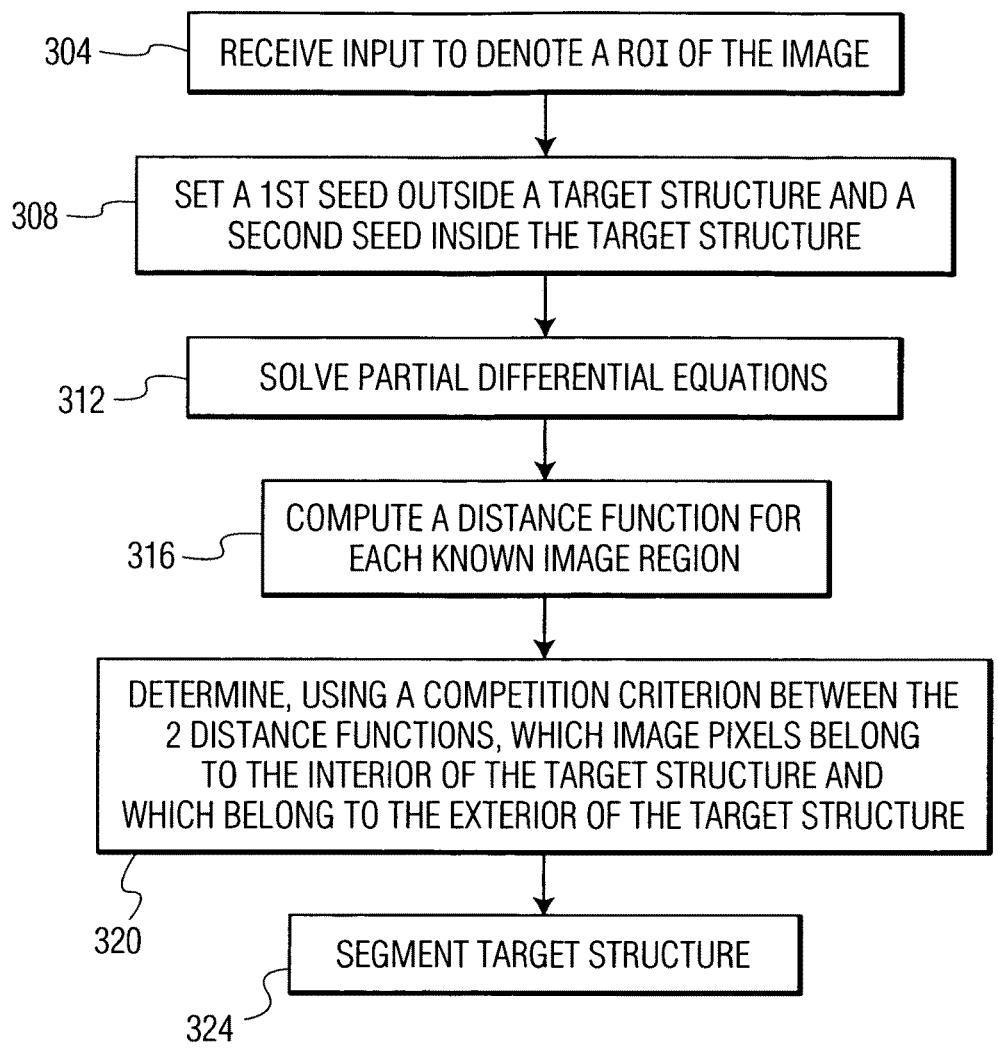
FIG. 3 is a high level flowchart showing the steps performed by a computer to segment a target structure within a region of interest of an image in accordance with an embodiment of the present invention.

FIG. 3 is a high level flowchart showing the steps of a method, illustratively performed by the computer of FIG. 2, to segment a target structure from a region of interest of an image in accordance with an embodiment of the present invention. First, one or more inputs to denote a region of interest (ROI) of a particular image are received (e.g., mouse clicks defining the ROI are received) in step 304. The computer (i.e., processor) then sets a first seed outside a target structure within the ROI (i.e., outside of the boundaries of the target structure) and sets a second seed inside the target structure within the ROI (i.e., inside the boundaries of the target structure) in step 308. Partial differential equations (PDEs) (e.g., Eikonal or diffusion equations) are then solved in step 312. Specifically, a PDE associated with the first seed outside the target structure is solved and another PDE associated with the second seed inside the target structure is also solved. The first seed and the second seed may each be one seed or a plurality of seeds.

In step 316, a distance function for each known image region is determined. In particular, a first distance function for the PDE associated with the first seed is determined and another second distance function for the PDE associated with the second seed is determined. In one embodiment, the first distance function represents the distance to the nearest of a set of prespecified points (i.e., seed or seeds) interior to the desired structure The second distance function represents the distance to a set of prespecified points (i.e., seed or seeds) exterior to the structure.

A competition criterion between the two distance functions is then used to determine which image pixels belong to the interior region of the image (i.e., pixels within the target structure) and which pixels belong to the exterior region of the image (i.e., pixels outside the target structure) in step 320. This determination is then used to segment the target structure from the ROI of the image in step 324.

In one embodiment, the local travel cost for each distance function depends on the local image intensity variation. A travel cost is the cost associated by the step taken by the fictitious front that is propagating. The local travel cost at each image coordinate x is determined locally by the image characteristics in a neighborhood of x. Further, regions that are more likely to be edges are interpreted as regions that have higher local distance. Here, local distance is used interchangeably with the local travel cost. For example, the computer can first generate a binary map (i.e., a 2D array of ones and zeros, with ones representing the edges) after detecting edges of the image (e.g., using a Canny edge detector). Edges may be considered impassable obstacles and the distance function can be computed accordingly. Alternatively, the local distance can be defined as a function of the gradient magnitude of the image. In another embodiment, a set of local distances can be combined with different weights (i.e., coefficients).

In more detail, the following equation, which is referred to as the Eikonal equation, is a partial differential equation (PDE):

$$\|\nabla D\| = F, D = 0 \text{ on } G \quad (1)$$

whose solution $D: \Omega \subset \Re^n \to \Re$, where n is the dimensionality of the image, represents the arrival time of a moving front with spatially varying speed, 1/F, that starts at a given set of points, $G \subset \Omega$, at time 0, and $\Omega$ is the domain on which the distance function D is defined. When the speed of the front is uniform within the domain $\Omega$, the arrival time is proportional to the minimum distance to G, the set of starting points. As used herein, D denotes a distance function (i.e., the distance to the set G with locally varying travel cost, F).

Local distance or travel cost varies accordingly with the presence of an image edge or with local intensity variation. A "fast marching algorithm" can yield an efficient solution to the Eikonal equation on a uniform discrete grid. While the proposed steps apply for continuous image domains with differentiable images, discrete grid locations are referred to below and, as a result, finite difference approximations to the derivatives are applied.

Figure 4:
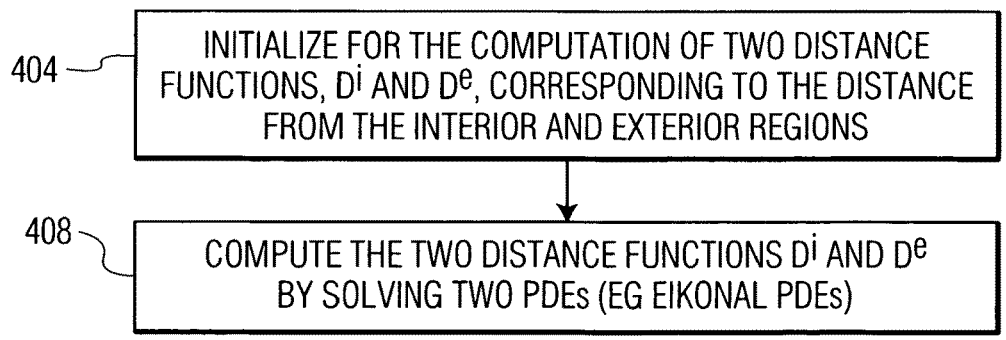
FIG. 4 is a flowchart showing the steps performed by a computer to compute two distance functions, $D^i$ and $D^e$, corresponding to the distance from the interior and exterior regions of an image in accordance with an embodiment of the present invention.

FIG. 4 is a flowchart showing the steps performed to compute two distance functions, $D^i$ and $D^e$, corresponding to the distance from each pixel to a seed point inside the target structure and the distance from each pixel to a different seed point exterior to the target structure, respectively. The computer initializes for the computation of the two distance functions in step 404. The two distance functions are then computed by solving two corresponding PDEs (e.g., Eikonal PDEs) in step 408.

Figure 5:
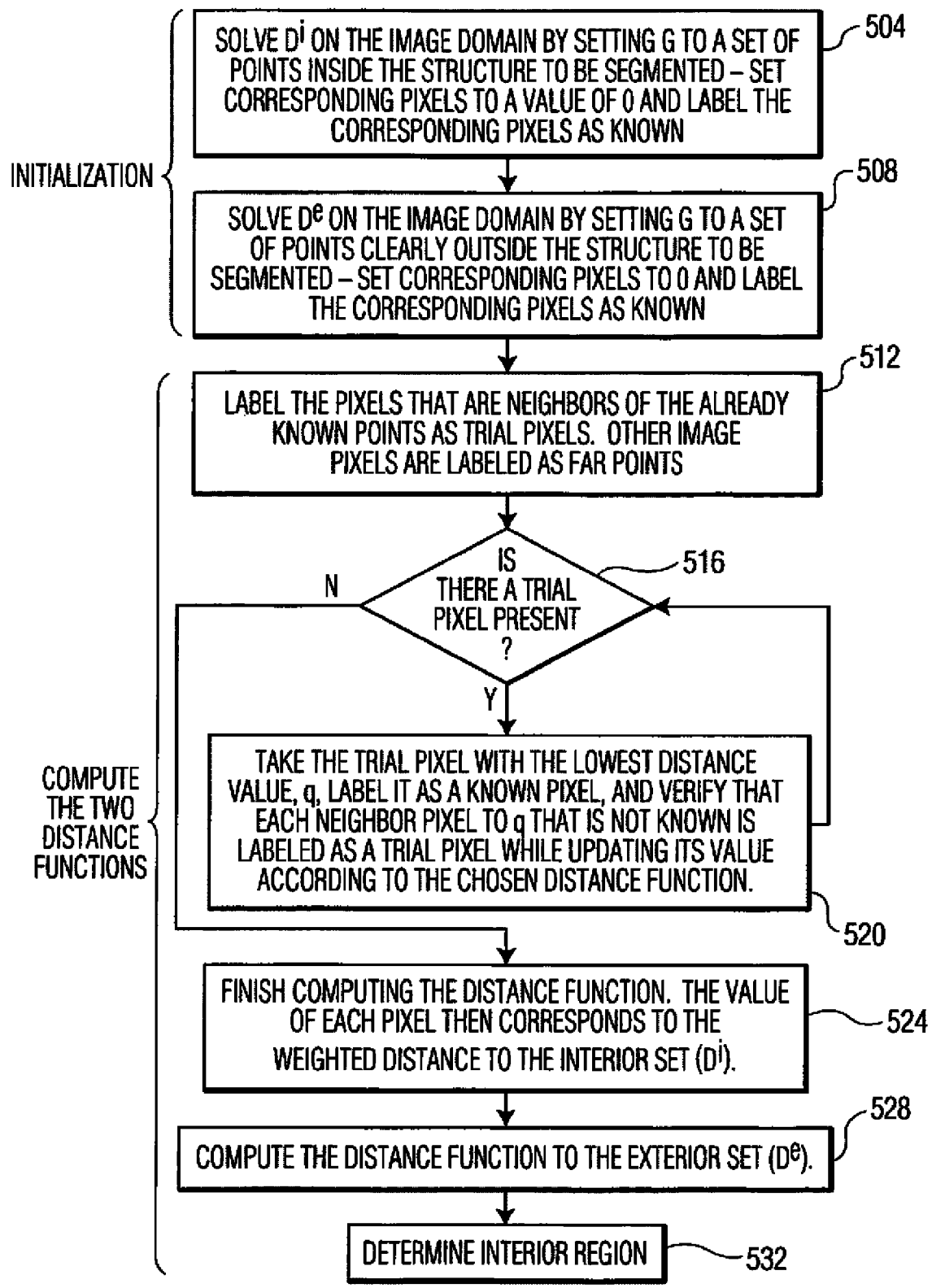
FIG. 5 is a flowchart showing the Eikonal PDE-based method performed by a computer in accordance with an embodiment of the present invention.

FIG. 5 is a flowchart showing the Eikonal PDE-based method performed by the computer in accordance with an embodiment of the present invention. Initialization for the computation of two distance functions, $D^i$ and $D^e$, corresponding to the distance from the interior and exterior regions, respectively, is performed in steps 504 and 508. In particular, the computer solves $D^i$ on the image domain by setting G to a set of points inside the structure to be segmented. This is performed by setting corresponding pixels to a value of 0 and by labeling the corresponding pixels as Known in step 504. $D^e$ on the image domain is then determined by setting G to a set of points clearly outside the structure to be segmented. This is performed by setting corresponding pixels to 0 and by labeling the corresponding pixels as Known in step 508. This is the same operation as previously described in step 504 but executed at a different time. Specifically, at the first time, only the exterior set is initialized and $D^e$ is estimated. At a second time, only the interior set is initialized and $D^i$ is estimated.

The two distance functions $D^i$ and $D^e$ are then computed in steps 512-532 by solving the two Eikonal PDE's (e.g., through fast marching). In particular, the pixels that are neighbors of the already Known points are labeled as Trial pixels in step 512. Other image pixels are labeled as Far points. It is then determined whether there is a Trial pixel present in step 516. If so, the Trial pixel with the lowest distance value, q, is selected, the pixel is labeled as a Known pixel, and it is verified that each neighbor pixel to q that is not Known is labeled as a Trial pixel while its value is updated according to the chosen distance function in step 520. The process then returns to step 516 and it is again determined whether there is a Trial pixel present.

If not, then the distance function to the interior set is computed with local travel cost, F, in step 524. The value of each pixel then corresponds to the weighted distance to the interior set ($D^i$). In one embodiment, this step is initialized with interior points as Known set. The distance function to the exterior set ($D^e$) is then computed in step 528 by repeating steps 512-524 with respect to the exterior set ($D^e$). In one embodiment, this step is initialized with exterior points as Known set.

The interior region of the image is then determined in step 532. The interior region is the set of points whose interior distance value is less than the exterior distance value, i.e., the interior set is $\{(x,y):D^i(x,y)<D^e(x,y)\}$ in the case of a two-dimensional image. The local travel cost, F, of the distance functions are explained in more detail below.

In one embodiment, to solve an Eikonal PDE, a fast marching algorithm is used.

Fast Marching with Edge Map

In one embodiment, the distance function is computed in a way such that edge pixels represent points where the moving front cannot propagate. The Eikonal equation is then, $$\|\nabla D\| = \frac{1}{1-E}, D=0 \text{ on } G, \qquad (2)$$

where E is the edge map that assumes the value of $1-\epsilon$ where there are edges and the value of 0 at all other pixels. The computer performs this computation to determine the solution where $\epsilon>0$ approaches 0 in order to represent locally infinite travel cost. The edge map can be derived from any edge detection algorithm that has binary output. In one embodiment, a Canny edge detector is used.

As one skilled in the art will recognize, Canny edge detection algorithms report an edge map that has no a priori known topology, i.e., it does not necessarily partition the region of interest into clear interior and exterior regions. The problem of obtaining a labeling for each pixel as an interior or exterior region is therefore not typically solved by edge detection alone. In accordance with the present invention, the competition algorithm is used in addition to the Canny edge detection algorithm.

Figure 6:
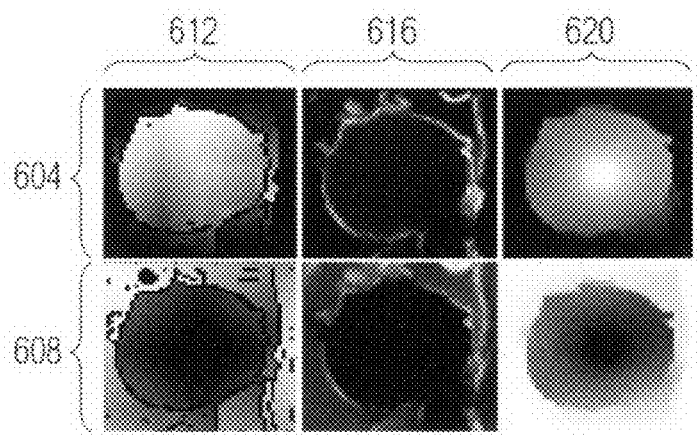
FIG. 6 is a diagram illustrating an exterior distance function and an interior distance function in accordance with an embodiment of the present invention.

FIG. 6 is a diagram illustrating an exterior distance function in a top row 604 and an interior distance function in a bottom row 608. In the fast marching algorithm, the edge pixels are typically marked as having infinite local travel cost and their initial label is set to Known. Therefore, the edge pixels are not typically processed during the distance function computation.

The first column 612 depicts the two distance functions computed by starting from both exterior and interior seed points. The distance shown in FIG. 6 is represented in gray scale, with gray corresponding to a higher distance and black corresponding to a lower distance. The exterior distance function (i.e., row 604) has high distance inside the lymph node and low distance outside the lymph node, and the opposite is true for the interior distance function (i.e., row 608).

Fast Marching with Gradient

In one embodiment, regions of interest with high gradient magnitude are treated as having high local travel cost, and regions with low gradient magnitude are treated as having low local distance. The Eikonal equation then takes the form:

$$\|\nabla D\| = \|\nabla I\|, D=0 \text{ on } G, \qquad (3)$$

In one embodiment, this method is more tolerant and resistant to errors in the edge map (e.g., from noise in the image) since the technique allows moderate levels of intensity variation to affect the local travel cost by a moderate amount instead of being classified as either edge or non-edge.

The above method can be further generalized by considering the Eikonal equation, $\|\nabla D\|=f(\|\nabla I\|)$. In some embodiments of the function f, particularly those that resemble thresholding functions such as the sigmoid, show the relationship between the current method and the method described above since edge maps typically resemble such functions of the image gradient magnitude, $\|\nabla I\|$. In one embodiment, the second column 616 of FIG. 6 depicts the two distance functions computed with this method/equation.

Combined Method

The edge map and gradient methods described above can also be combined. In one embodiment, the computation of the edge map, E, results in a binary image assuming the value E=1 on edge pixels and E=0 elsewhere. This binary image is then directly added to the gradient image by a factor $\alpha$. The Eikonal equation then takes the form:

$$\|\nabla D\|=(\|\nabla I\|+\alpha *E). \qquad (4)$$

A specific choice of the parameter $\alpha$ depends on the level of trust that can be placed in the edge map, with higher trust corresponding to higher values of $\alpha$. This will result in increased gradient effects where there are edges.

Note that this technique, which assigns additional travel cost to areas where there are definite image edges, considers the Eikonal equation $\|\nabla D\|=f(\|\nabla I\|)$, i.e., with non-linear functions of the gradient image. For instance, choosing the function, $$f(z) = \frac{1}{1+e^{(-z+t)}} \qquad (5)$$

where t represents an image gradient magnitude threshold and can be chosen automatically based on the range values that the magnitude of the image gradient assumes. Many choices can be made for the function, f.

In accordance with an embodiment of the present invention, different PDEs can be used for each region of an image (i.e., the interior distance function can be obtained by solving a different PDE than the PDE solved to produce the exterior distance function). This flexibility may, for example, assist in the segmentation of interior regions that are textured.

Further, in one embodiment, an interior intensity based term can be added to the interior distance function. This added term can smooth the local gradient and decrease some texture or noise influence. Due to the nature of the main application (e.g., lymph node segmentation), the exterior distance function may not be smoothed in a similar fashion because exterior regions may include other structures that may interfere with the segmentation.

In one embodiment, in order to smooth the exterior distance function, the processor computes the mean intensity of a set of points adjacent to the foreground seed points as $\hat{I}$. The image at each pixel, p, then has a local weight of $(I(p)-\hat{I})^2$, which is added to the local travel cost in the Eikonal equation for the interior region with a weighting parameter, $\beta$, as follows:

$$\|\nabla D^i\|=(\|\nabla I\|+\alpha E+\beta(I-\hat{I})^2), \quad (6)$$

where E is the binary edge map and $\hat{I}$ is the mean intensity of points adjacent to the interior region seed points. Thus, the final combined method assumes the use of Eq. 4 for the computation of the exterior distance function and Eq. 6 for the computation of the interior distance function.

Diffusion Equation

The above embodiments have illustrated how Eikonal PDEs can be used. In another embodiment, a diffusion equation is used to propagate image information rather than the Eikonal equation. Although the nature of information propagation in diffusion equations is typically different than the information propagation in the Eikonal equation (e.g., diffusion equations often propagate information with infinite speed), the diffusion equation nonetheless propagates information in a similar manner to the previously mentioned distance function based techniques.

The linear heat equation on a function $D(\bar{x},t):\Omega\times[0,\infty)\to\Re$, where $\bar{x}\in\Omega$, is given by $$\frac{dD}{dt}=\Delta D$$

where $\Delta D$ is the Laplacian operator. In one embodiment, the initial conditions are $D(\bar{x})|_{t=0}=D_0(\bar{x})=0$ and Dirichlet boundary conditions D=1 on G for a prespecified seed set $G\subset\Omega$. A finite difference approximation to this equation for two-dimensional images, that is obtained by implementing a forward Euler numerical scheme with the maximally stable time step is, $$D(x,y)=\frac{1}{4}D(x+1,y)+\frac{1}{4}D(x-1,y)+ \quad (7)$$
$$\frac{1}{4}D(x,y-1)+\frac{1}{4}D(x,y+1),$$

hence diffusing edge information from the boundaries towards the non-boundary regions.

Similar to the Eikonal equation and fast marching techniques, where the information is propagated from the boundaries or the seeds of the image domain towards unlabeled points, diffusion equations can also be used for segmentation by creating two smooth distance functions, one for the interior seed points and one for the exterior seed points. For the interior distance function, $D^i$, the boundary conditions are illustratively set to 1 at the interior seed points and the function is initialized illustratively to a value of 0 at all other points in the image domain. For the exterior distance function, $D^e$, the boundary conditions are illustratively set to 1 at the exterior seed points and the function is initialized illustratively to a value of 0 at all other points in the image domain.

To introduce image dependent terms to the diffusion equation, an anisotropic diffusion that depends on the local image variation is used, thereby allowing less diffusion in directions where the image derivative is higher and more diffusion where the image derivative is low. The definition of the four one-sided image derivatives around a pixel can be given by $$I_x^-(x,y)=I(x,y)-I(x-1,y), I_x^+(x,y)=I(x+1,y)-I(x,y)$$

$$I_y^-(x,y)=I(x,y)-I(x,y-1), I_y^+(x,y)=I(x,y+1)-I(x,y)$$

An image-based discrete diffusion equation can be generated by introducing the image-driven weights to the discrete Laplacian equation as follows:

$$D(x,y)=\frac{w^E}{\sum_i w^i}D(x+1,y)+\frac{w^W}{\sum_i w^i}D(x-1,y)+ \quad (8)$$
$$\frac{w^N}{\sum_i w^i}D(x,y-1)+\frac{w^S}{\sum_i w^i}D(x,y+1),$$
$$w^E=e^{-\gamma(I_x^+)^2}, w^W=e^{-\gamma(I_x^-)^2},$$
$$w^N=e^{-\gamma(I_y^-)^2}, w^S=e^{-\gamma(I_y^+)^2}, i\in\{E,W,N,S\}.$$

Note that $\gamma$ represents a damping coefficient that affects the level of anisotropy inherent in this method. Higher values of $\gamma$ allow for greater anisotropy, i.e., allow for the information diffusion to be more sensitive to differences in image intensity across the image. A reasonable range for this parameter may be, for example, $0.001<\gamma<0.01$.

Using the set of seeds for the exterior region and the interior region as two distinct set of boundary conditions, the two distance functions, $D^e$ and $D^i$, corresponding to the exterior and interior are estimated after a set amount of diffusion time. Similar to the approach described above with respect to the Eikonal equation, the segmentation map is formed by considering the interior region (i.e., interior of the target structure) to be the set of points where the interior distance function is higher than the exterior distance function. The third column 620 in FIG. 6 depicts the resulting distance functions estimated by the diffusion method.

In one embodiment, the diffusion is executed for a sufficiently long time for all pixels to be affected by the diffusion but for a short enough time for the diffusion to be practically useful, i.e., to avoid the constant solution D=1 along the entire domain. In practice, k=1000 forward Euler iterations often produces suitable results and the results are not particularly sensitive to moderate variations in k.

Two Region Segmentations

In one embodiment, the algorithm described above is not sensitive to the placement of the interior and exterior seed points. It may be possible to use any set of exterior or interior seed points as long as they are clearly outside or inside of the target structure, respectively. In one embodiment, a mouse drag operation is used on the image to set exterior seeds in the form of a 2D rectangular border, as shown in FIG. 1. The interior seeds are then automatically set to the set of pixels in the inside (e.g., center) of this rectangle. Thus, a user may have to specify two points, i.e., the top left point and the bottom right point of the rectangular region of interest.

Segmentation Results

Figure 7:
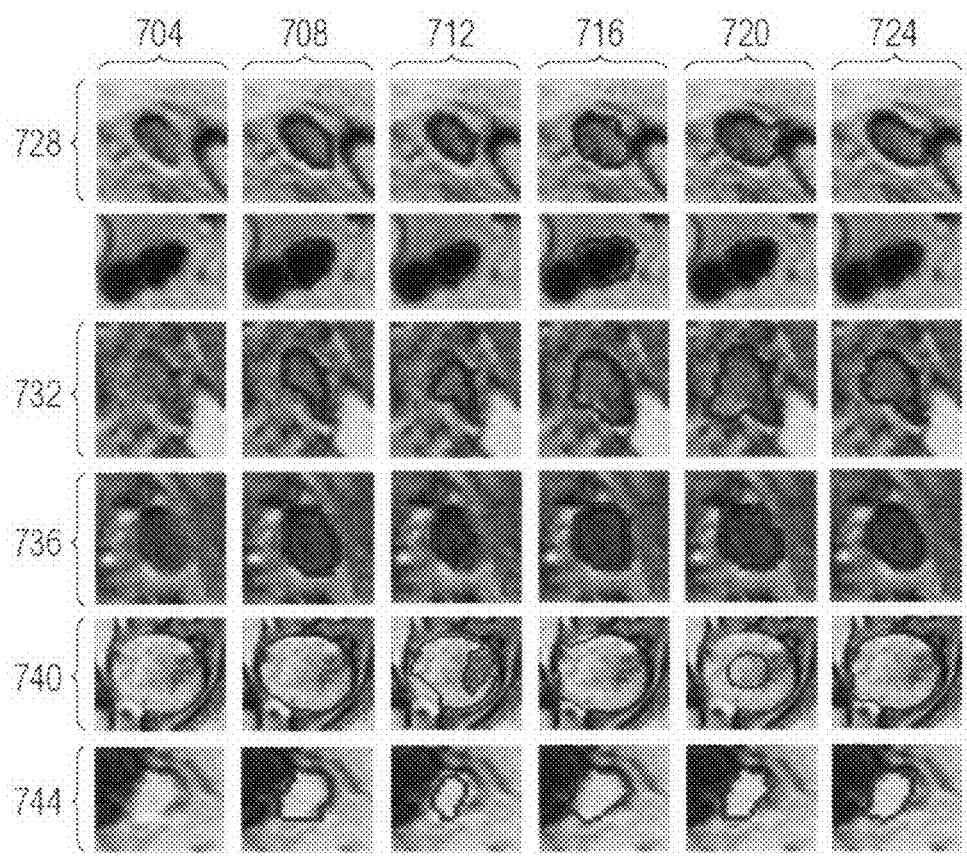
FIG. 7 is a diagram of segmentation results for different lymph nodes in MR images in accordance with an embodiment of the present invention.

FIG. 7 is a diagram of segmentation results for different lymph nodes in MR images in accordance with an embodiment of the present invention. Column 704 shows the ROI of an image. Column 708 shows a node (e.g., lymph node) manually delineated, column 712 shows results of the edge map method, and column 716 shows results of the gradient method. Column 720 shows results of the diffusion method and column 724 shows results of the combined method described above.

The Canny edge detector typically propagates strong edges and discards the weak edges, and this can lead to errors, e.g., either "holes" in the edge map as in row one 728, or edge noise as in rows three 732, four 736, and five 740. This can directly influence the distance functions and, in turn, may influence the final segmentation.

These errors may be reduced by the second approach that uses image gradient in the Eikonal PDE. The distances found are more tolerant and resistant to errors in the edge map functions, and the segmentation matches the desired structure more closely.

Referring once again to the example of a lymph node, discussed herein above, in cases where a strong edge is situated near the edges of the lymph node, but yet external to the lymph node itself, the gradient method may be used, as shown in the bottom right of the image in row 1 728 and column 716 and row 6 744 and column 716. Note that such errors may be fixed by assuming more than two regions are present in the image. These errors can also be reduced via the diffusion method described herein above.

The diffusion method typically performs well when image edges are strong and robust to higher levels of image noise, especially to noise that occurs at a single pixel (i.e., "salt and pepper" noise). The reason for this is the ability for the diffusion equation to propagate information around a single pixel that, due to noise, has an abnormally high intensity value. This property does not typically hold for the image gradient based techniques because such noise affects the image gradient in a neighborhood around the pixel, thereby creating a larger region of high local travel cost. This method may be prone to error when the target objects are merged with other external structures containing high edge content (e.g., as shown in the images of the fifth row 740).

The results of the combined method discussed herein above are shown in column 724. This method specifically prohibits the propagation of information where an edge is detected (whereas such information often propagates in the image gradient method). However, when an edge is not detected, the combined method allows for varying degrees of information propagation depending on the magnitude of the image gradient.

Segmentation in 3D

Figure 8:
FIG. 8 shows results of 3D segmentation of anatomic structures based on Eikonal PDE's in accordance with an embodiment of the present invention.

Segmentation in 3D can also be achieved using the Eikonal PDEs and diffusion PDEs by extending the fast marching (in the case of the Eikonal PDE) and the gradient computations to three dimensions FIG. 8 shows results 804, 808 of 3D segmentation of anatomic structures based on Eikonal PDE's in accordance with an embodiment of the present invention.

Figure 9:
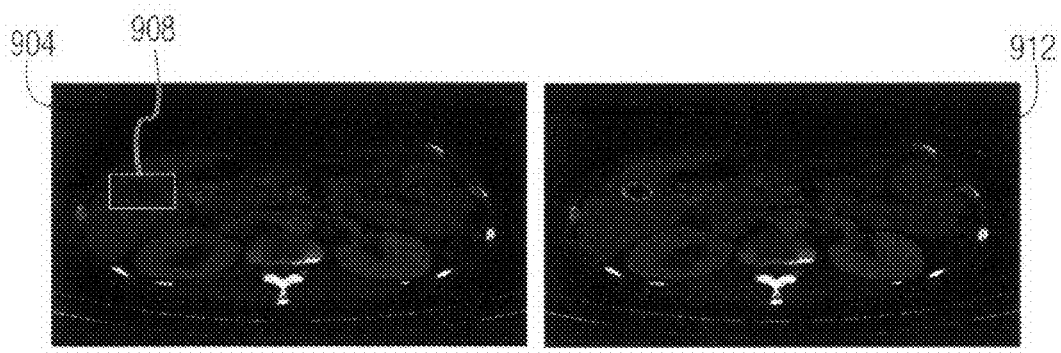
FIG. 9 is an example of a Computed Tomography (CT) image showing a selected region of interest containing a liver tumor on the left and the segmentation of the tumor as shown on the right image in accordance with an embodiment of the present invention.
Figure 10:
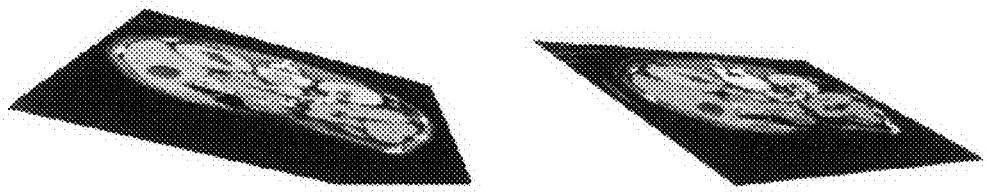
FIG. 10 is an image of 3D tumor extraction results in accordance with an embodiment of the present invention.
Figure 11:
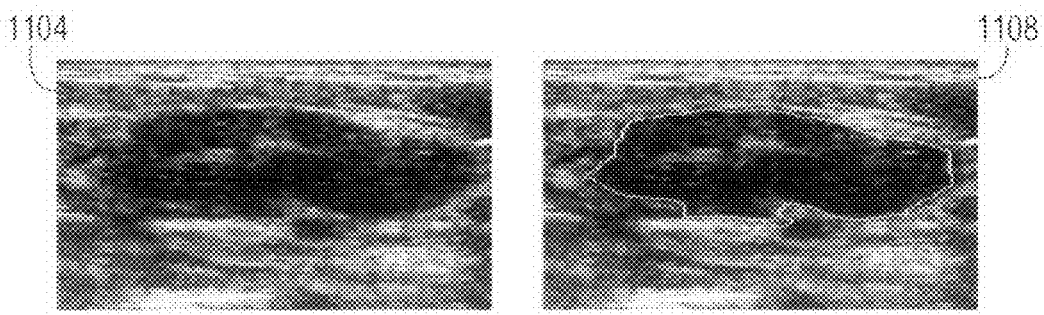
FIG. 11 is an example of a breast mass segmentation in an ultrasound image in accordance with an embodiment of the present invention.

FIG. 9 is an example of a Computed Tomography (CT) image 904 showing a selected region of interest 908 containing a liver tumor on the left and the segmentation of the tumor as shown on the right image 912. The 3D tumor extraction results are shown in FIG. 10. Such 3D segmentations can be useful, for example, when trying to determine the volume of a tumor (e.g., to assess the longitudinal efficacy of treatment). FIG. 11 shows an example of a breast mass segmentation in an ultrasound image 1104, 1108. Ultrasound images 1104, 1108 may have speckle noise that hampers segmentation. As a result, the image may be preprocessed with a high level of smoothing to reduce the noise.

Multi-Region Segmentation

In accordance with an embodiment of the present invention, the techniques described above can also be used for multi-region segmentation. Instead of choosing only interior and exterior seed regions as in the two region segmentation described above, the multiple region segmentation technique allows for any number of seed regions, where each seed region can correspond to a target structure of interest within the image.

For each seed region, the processor can compute a distance function from that seed region as described above. The segmentation labels are assigned by determining which distance function has the lowest value for a given pixel. That is, for each label index, I, the set of points corresponding to that region, $L_i$ is given by:

$$L_i = \{(x,y) : D_i(x,y) \leq D_j(x,y), \forall j \neq i\}. \quad (9)$$

Note that some pixels may be defined with multiple labels using such a definition. However, these pixels are typically pixels that are on the border between two or more regions and can be thus considered border pixels or can be assigned to one region or the other without any loss in the utility of the method.

Figure 12:
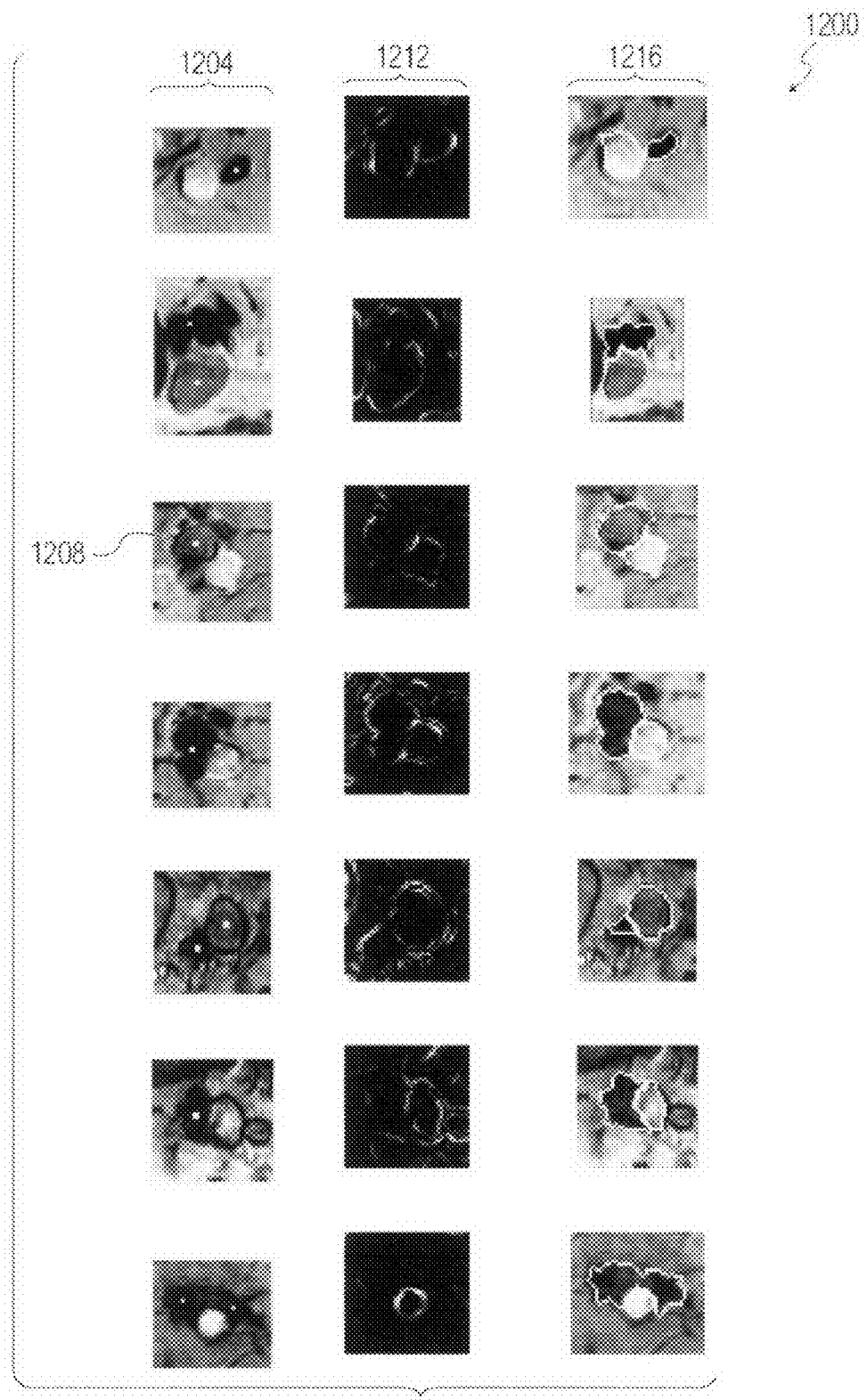
FIG. 12 shows examples of three region segmentations in accordance with an embodiment of the present invention.

FIG. 12 shows some examples of three region segmentations 1200. Each row in FIG. 12 corresponds to a different region of interest in a MR lymph node segmentation application. The left column 1204 shows the initial region of interest (ROI) along with the user specified seeds in yellow (e.g., seed 1208). In one embodiment, there are typically two foreground seeds and a single background seed surrounding the entire region. In the final row, however, there are two foreground seeds, one of which is split along the two dark blood vessels, and one of which is in the white lymph node.

The middle column 1212 shows the gradient of the smoothed ROI, and the right column 1216 shows the corresponding final segmentation result using the method of distance function locally weighted by the image gradient alone, i.e., $\|\nabla D\| = \|\nabla I\|$. For each image, one seed region is the rectangular box surrounding the structure and two interior seed regions are chosen, one inside of each region of interest as shown in the first column.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting a target structure of an image comprising:
   receiving, at a computer, input to denote a region of interest of said image;
   setting a first seed representing at least one pixel outside of a target structure within said region of interest and a second seed representing at least one pixel inside said target structure;
   solving a first partial differential equation associated with said first seed and a second partial differential equation associated with said second seed to determine whether an exterior distance function has a minimum distance from said first seed and to determine whether an interior distance function has a minimum distance from the second seed, said exterior distance function and said interior distance function each representative of a distance to a set of points with a local travel cost; and segmenting said target structure from said image using a competition criterion between said interior distance function and said exterior distance function to determine said target structure.

2. The method of claim 1 wherein at least one of said first partial differential equation and said second partial differential equation is at least one of an Eikonal differential equation and a diffusion equation.

3. The method of claim 1 further comprising labeling a pixel at least one of inside and outside said target structure of said image.

4. The method of claim 1 wherein said exterior distance function is associated with a plurality of pixels outside said target structure.

5. The method of claim 1 wherein said interior distance function is associated with a plurality of pixels inside said target structure.

6. The method of claim 1 wherein said using a competition criterion comprises determining, at each image coordinate point, whether said interior distance function or said exterior distance function has a minimum value.

7. The method of claim 1 wherein at least one of said first seed further comprises at least one of a single seed and a plurality of seeds and said second seed further comprises at least one of a single seed and a plurality of seeds.

8. The method of claim 1 wherein said solving of said first partial differential equation associated with said first seed and a second partial differential equation associated with said second seed further comprises using a fast marching algorithm.

9. A system for segmenting a target structure of an image comprising:

means for receiving input to denote a region of interest of said image;

means for specifying setting a first seed representing at least one pixel outside of a target structure within said region of interest and a second seed representing at least one pixel inside said target structure;

means for solving a first partial differential equation associated with said first seed and a second partial differential equation associated with said second seed to determine whether an exterior distance function has a minimum distance from said first seed and to determine whether an interior distance function has a minimum distance from the second seed, said exterior distance function and said interior distance function each representative of a distance to a set of points with a local travel cost; and means for segmenting said target structure from said image comprising means for using a competition criterion between said interior distance function and said exterior distance function to determine said target structure.

10. The system of claim 9 wherein at least one of said first partial differential equation and said second partial differential equation is at least one of an Eikonal differential equation and a diffusion equation.

11. The system of claim 9 further comprising means for labeling a pixel at least one of inside and outside said target structure of said image.

12. The system of claim 9 wherein said exterior distance function is associated with a plurality of pixels outside said target structure.

13. The system of claim 9 wherein said interior distance function is associated with a plurality of pixels inside said target structure.

14. The system of claim 9 wherein said means for using a competition criterion further comprises means for determining, at each image coordinate point, whether said interior distance function or said exterior distance function has a minimum value.

15. The system of claim 9 wherein said means for solving of said first partial differential equation associated with said first seed and a second partial differential equation associated with said second seed further comprises means for using a fast marching algorithm.

16. A non-transitory computer readable medium comprising computer program instructions capable of being executed in a processor and defining the steps comprising:

receiving input to denote a region of interest of said image;

setting a first seed representing at least one pixel outside of a target structure within said region of interest and a second seed representing at least one pixel inside said target structure;

solving a first partial differential equation associated with said first seed and a second partial differential equation associated with said second seed to determine whether an exterior distance function has a minimum distance from said first seed and to determine whether an interior distance function has a minimum distance from the second seed, said exterior distance function and said interior distance function each representative of a distance to a set of points with a local travel cost; and segmenting said target structure from said image using a competition criterion between said interior distance function and said exterior distance function to determine said target structure.

17. The non-transitory computer readable medium of claim 16 wherein at least one of said first partial differential equation and said second partial differential equation is at least one of an Eikonal differential equation and a diffusion equation.

18. The non-transitory computer readable medium of claim 16 further comprising computer program instructions defining the step of labeling a pixel at least one of inside and outside said target structure of said image.

19. The non-transitory computer readable medium of claim 16 wherein said exterior distance function is associated with a plurality of pixels outside said target structure.

20. The non-transitory computer readable medium of claim 16 wherein said interior distance function is associated with a plurality of pixels inside said target structure.

21. The non-transitory computer readable medium of claim 16 wherein said step of using a competition criterion further comprises determining, at each image coordinate point, whether said interior distance function or said exterior distance function has a minimum value.

22. The non-transitory computer readable medium of claim 16 wherein said step of solving of said first partial differential equation associated with said first seed and a second partial differential equation associated with said second seed to segment said target structure further comprises using a fast marching algorithm.

23. A method for segmenting a plurality of target structures from an image comprising:

receiving, at a computer, input to denote a plurality of regions of interest of said image;

setting a plurality of seeds, each seed in said plurality of seeds corresponding to a plurality of target structures in a region of interest in said plurality of regions of interest;

solving a plurality of partial differential equations, each partial differential equation in said plurality of partial differential equations corresponding to at least one target structure in said plurality of target structures and an exterior to said at least one target structure in said plurality of target structures to determine whether each of a plurality of distance functions has a minimum distance from a corresponding seed of the plurality of seeds, said distance functions each representative of a distance to a set of points with a local travel cost; and segmenting said plurality of target structures from said image using a competition criterion between said plurality of distance functions to determine said plurality of target structures.

24. The method of claim 23 wherein said using a competition criterion comprises determining, at each image coordinate point, which distance function in said plurality of distance functions has a minimum value.

25. The method of claim 24 further comprising labeling said image coordinate point with a label corresponding to said distance function with said minimum value.

* * * * *